March 28, 1961 G. A. DUBA 2,976,751
PROCESS OF SPLITTING AND HANDLING SURGICAL GUT
Original Filed July 27, 1955 11 Sheets-Sheet 1
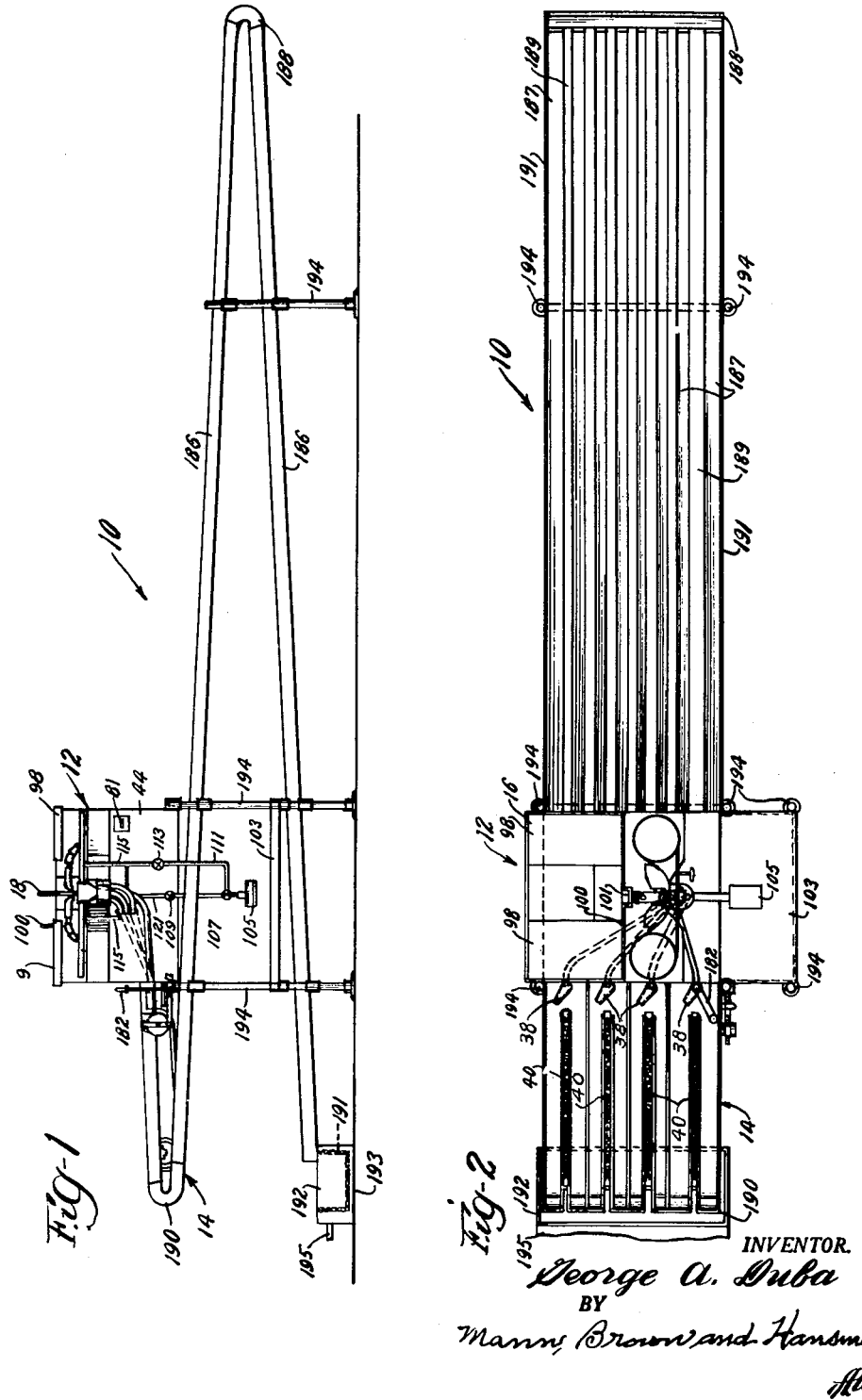
INVENTOR.
George A. Duba
BY
Mann, Brown and Hansmann
Attys.

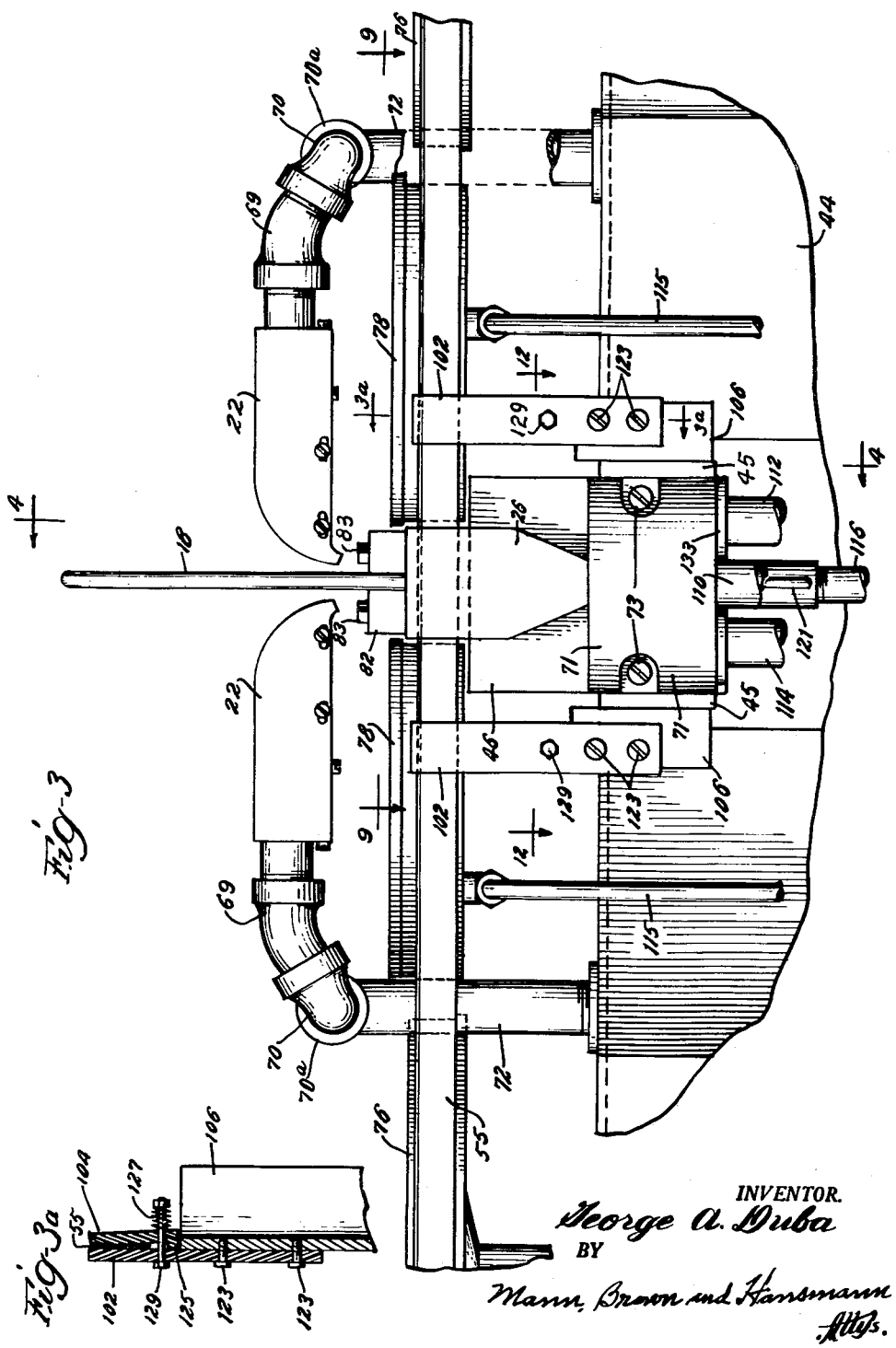

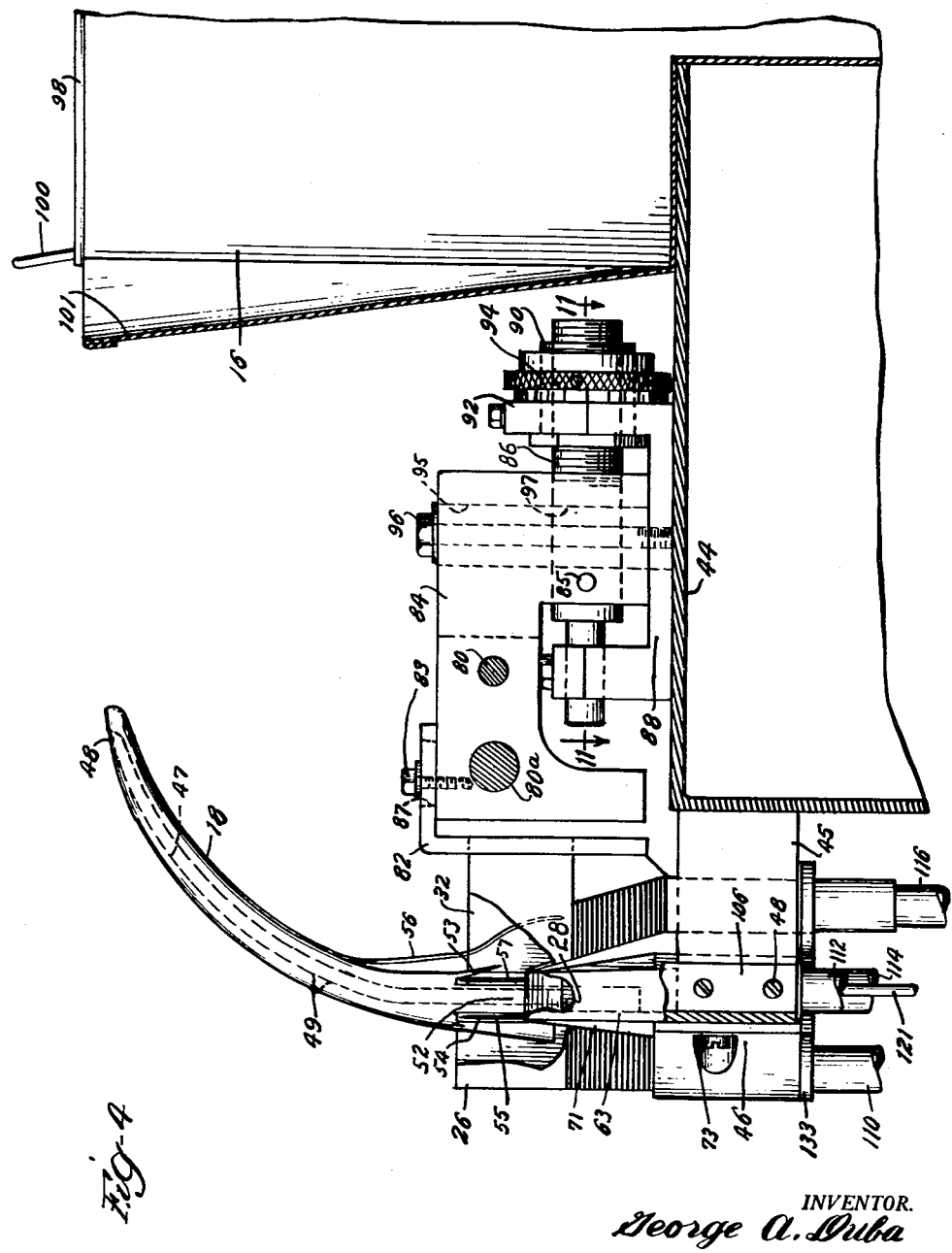

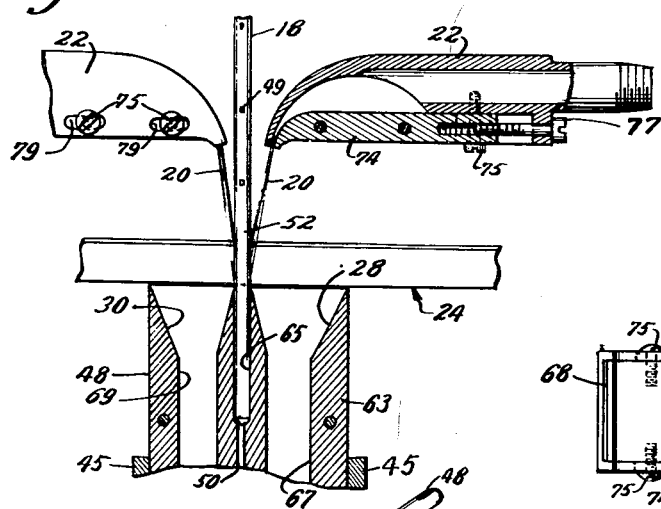
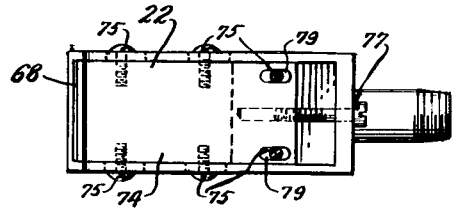
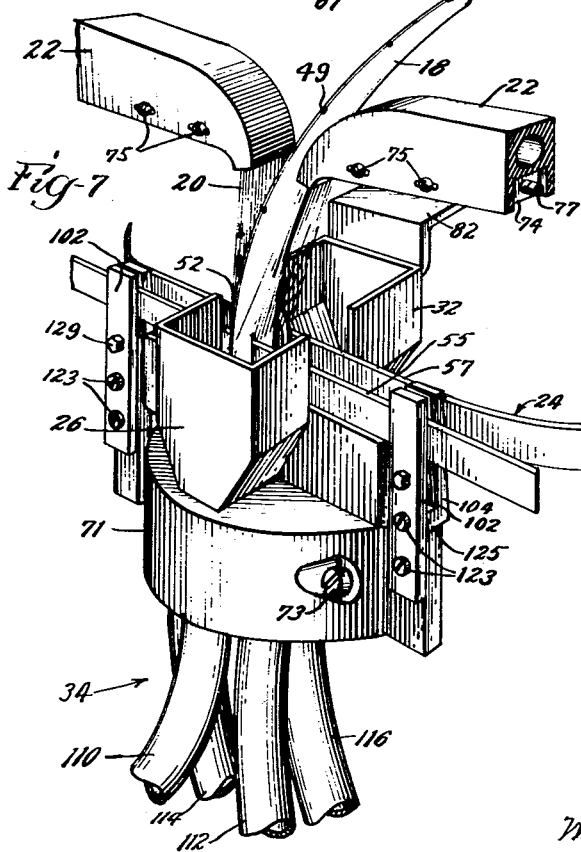
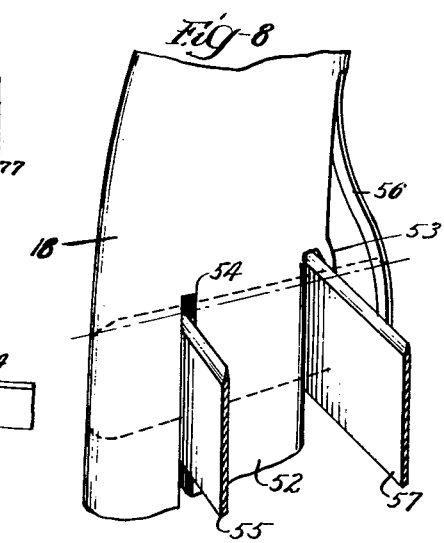

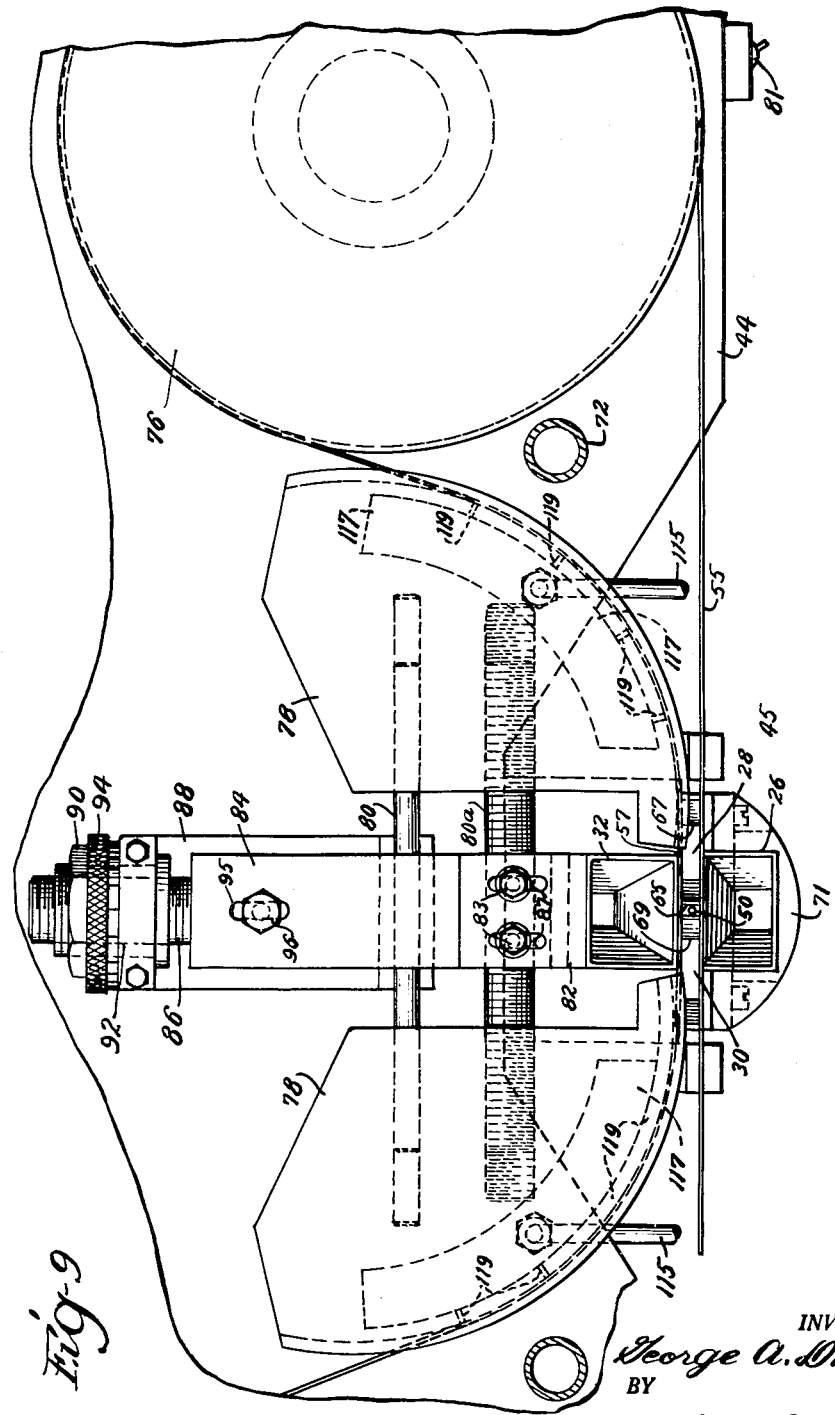

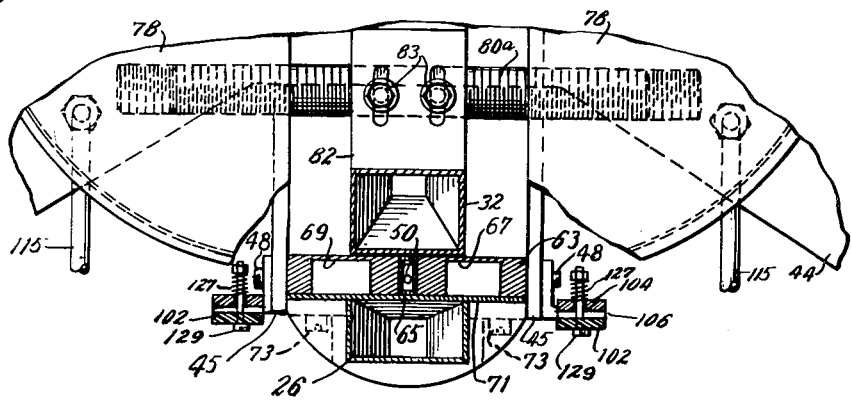
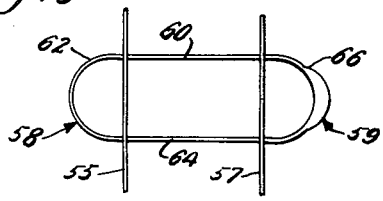
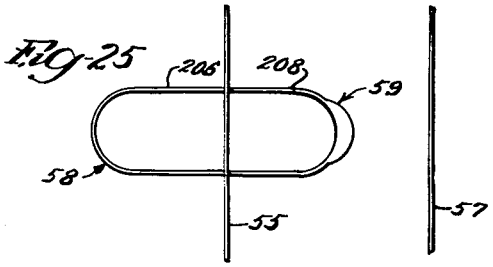
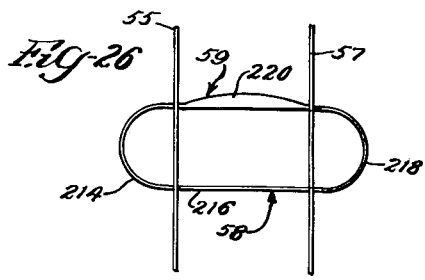
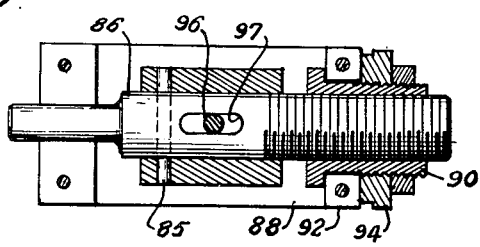

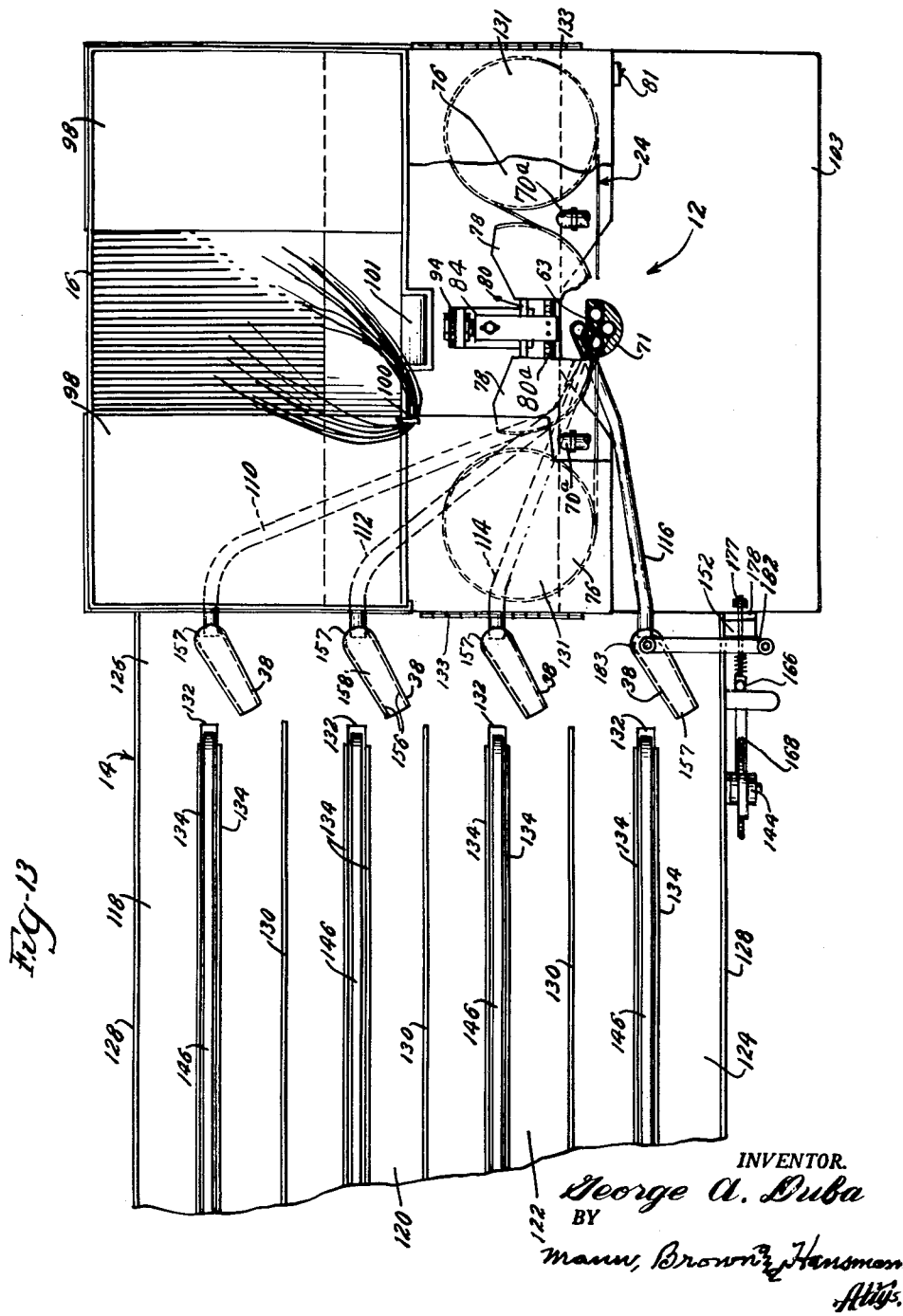

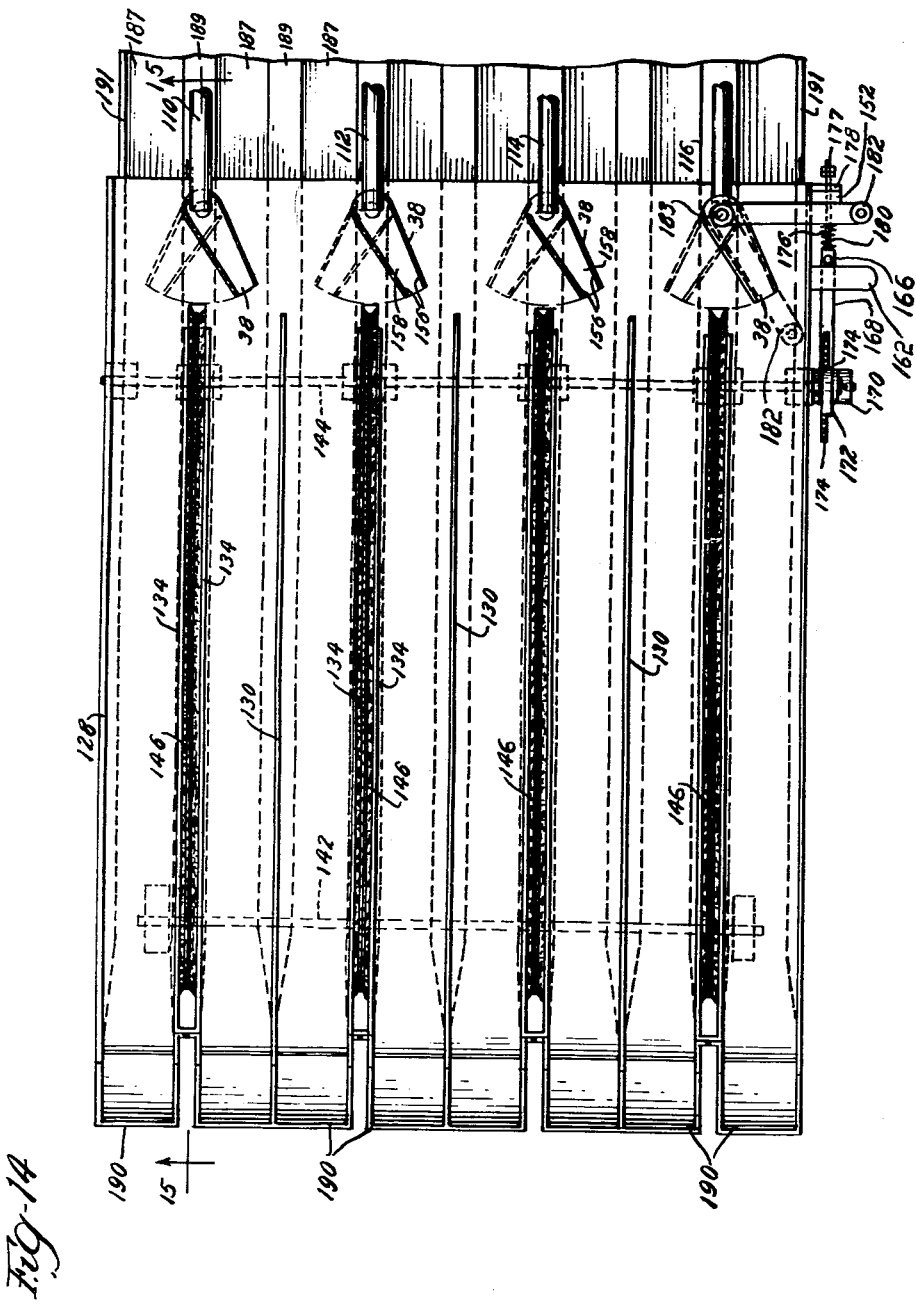

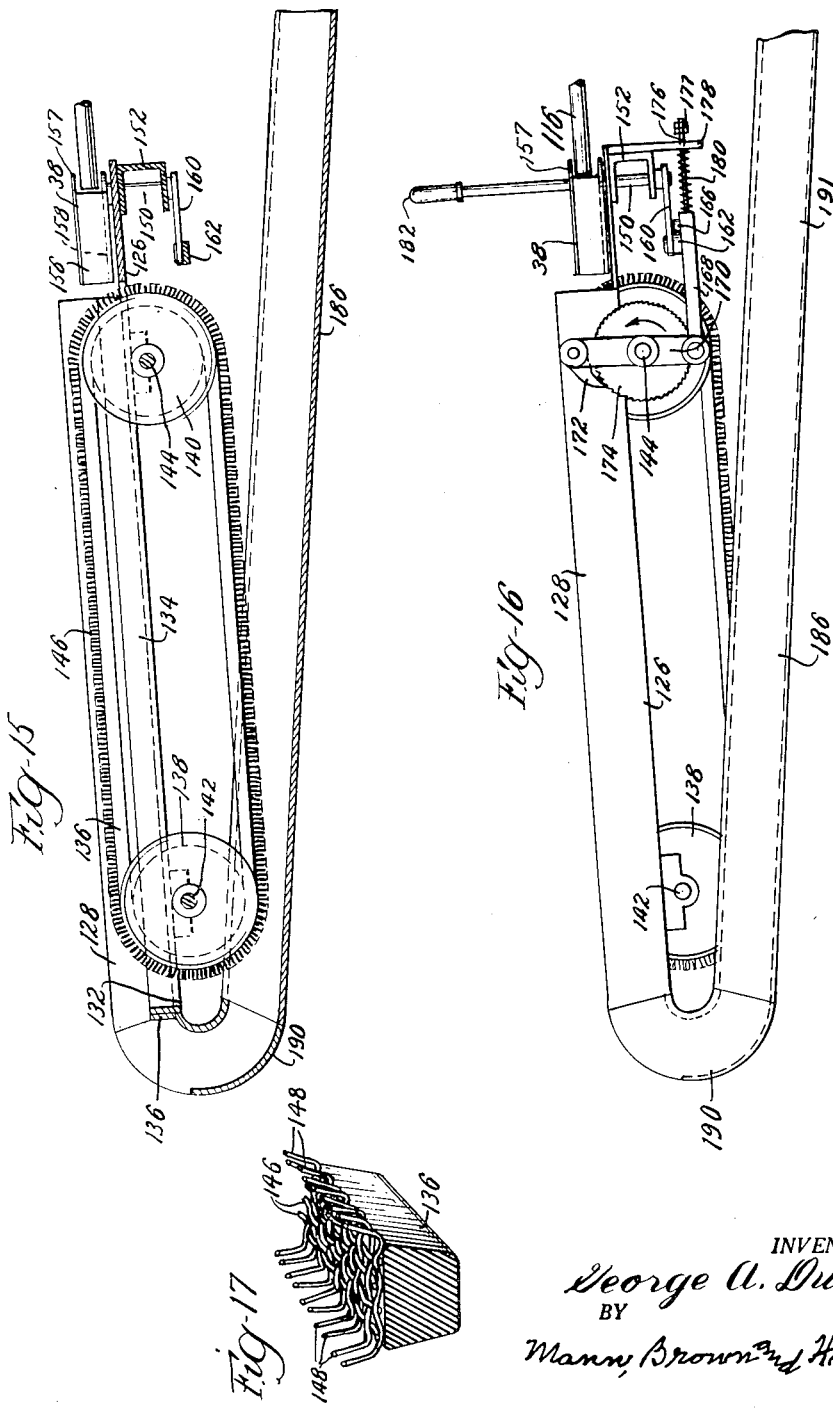

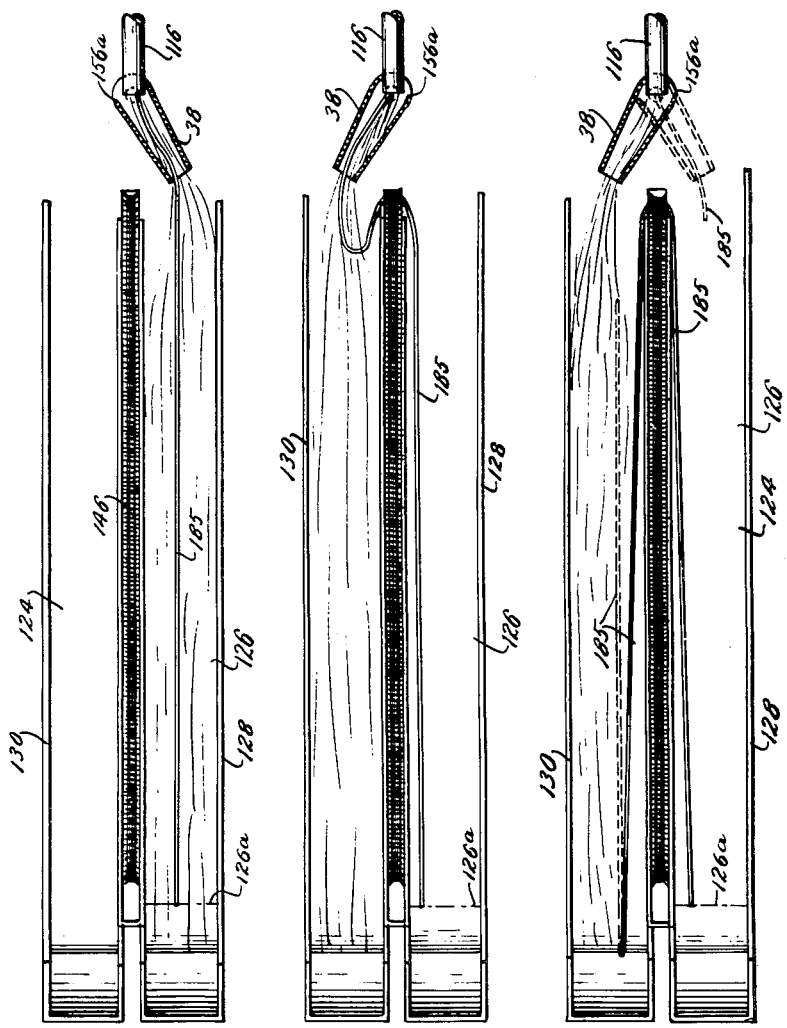

March 28, 1961 G. A. DUBA 2,976,751
PROCESS OF SPLITTING AND HANDLING SURGICAL GUT
Original Filed July 27, 1955 11 Sheets-Sheet 11
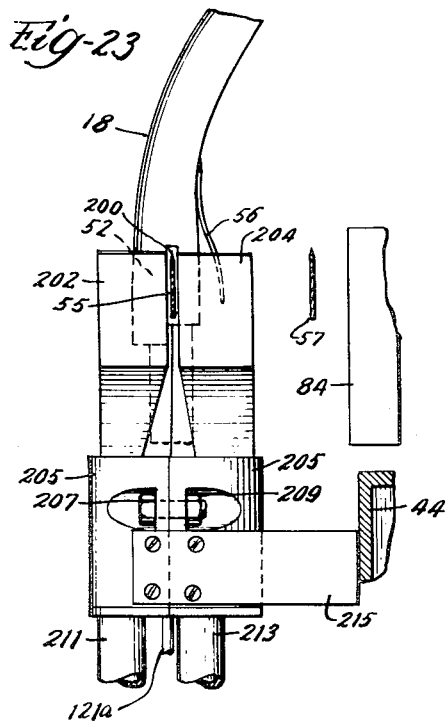
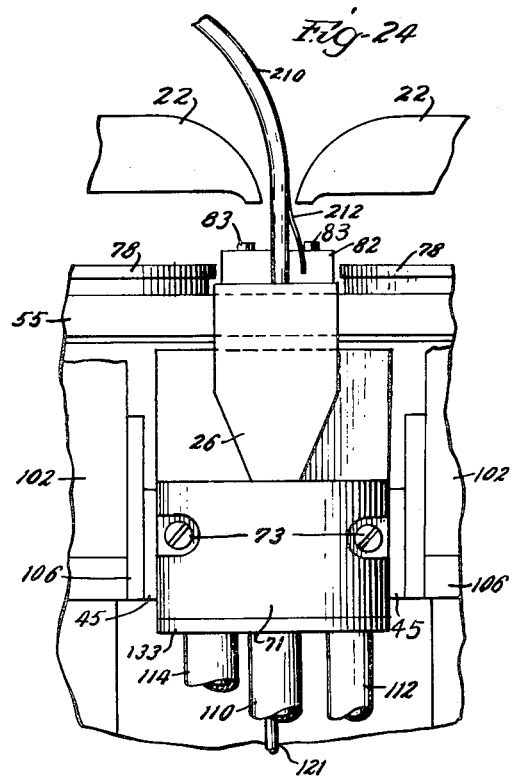
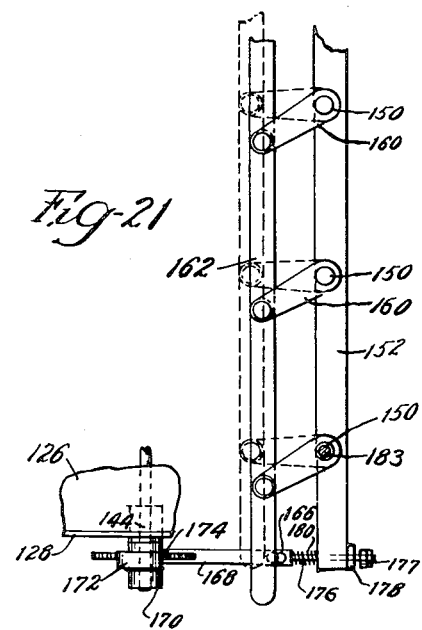
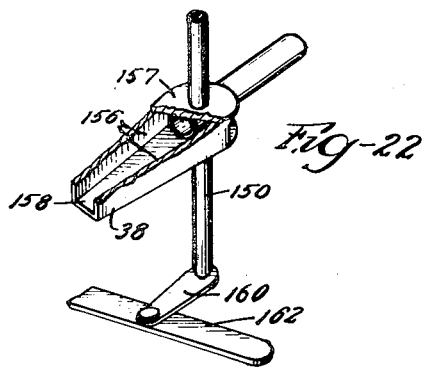
INVENTOR.
George A. Duba
BY
Mann, Brown & Hansmann
Atty's

United States Patent Office 2,976,751
Patented Mar. 28, 1961

2,976,751

PROCESS OF SPLITTING AND HANDLING SURGICAL GUT

George A. Duba, Chicago, Ill., assignor to Carl G. Bjorkman, Hinsdale, Ill.

Original application July 27, 1955, Ser. No. 524,790, now Patent No. 2,920,520, dated Jan. 12, 1960. Divided and this application Feb. 24, 1959, Ser. No. 795,041

6 Claims. (Cl. 83—24)

My invention relates to a process for making surgical and racket string gut or the like, and more particularly, to a method of handling gut during the processing of same.

In my copending application Serial No. 524,790, filed July 27, 1955 (now Patent No. 2,920,520, granted January 12, 1960), which is a continuation-in-part of my application Serial No. 416,899, filed March 17, 1954 (now abandoned), of both of which this application is a division, I disclose a machine and process for making surgical gut and the like wherein a gut is trained over a guide peg into contact with a pair of fluid jets which move the gut lengthwise against a band blade positioned cross-wise or perpendicular to the guide peg and the direction of travel of the gut. The present disclosure includes the basic principles described in said application and is directed specifically to the method of handling the gut during processing of same.

In making surgical gut and strings for tennis rackets and the like, the raw material involved is animal intestines. The present invention is particularly adapted for use in processing the intestines of sheep, known in the trade as sheep gut, though it has been found that hog and cattle gut may be treated in a like manner. The intestine of the sheep is quite long, but the portion of each gut suitable for use in the manufacture of surgical and string gut averages from seven to ten yards long. The sheep gut used is relatively thin, limp, pliable and frail, so it will be appreciated that special handling is required.

In the past, sheep gut has been split mainly by hand with the ribbons being dropped into a suitable receptacle adjacent the worker. Records show that skilled workers splitting by hand process between seventy and eighty gut an hour, splitting the gut three ways, or into three strips. A few machines have been developed for splitting the gut which employ circular or rotary cutting blades or slitters, and rollers or the like for gripping the gut to pull it over a guide peg against the rotating cutting blade. These machines have been able to increase the output of the worker up to one hundred twenty gut per hour, but it has been found that there is much waste due to the fact that the gut ribbons are not uniformly cut. This has been found to be due to the fact that the gut is distorted as it is drawn past the cutting blades. Such distortion is the result of the unequal stresses that are applied to the gut by the rollers gripping it. Also, as the gut is drawn past the cutting blade, the cutting edge thereof tends to pull the gut as it cuts it, since said cutting edge is travelling almost in the same direction that the gut travels over the guide peg. This tends to bunch the gut up as it is being cut.

After gut has been split, it has been the practice heretofore to place the gut ribbons in a receptacle until they are needed for further processing. As is well known in the trade, the gut ribbons tend to become greatly entangled with each other, making further handling tedious and time consuming and breakage likely.

The principal object of the present invention is to provide a new method for handling sheep gut and the like which results in the rapid formation of uniform strips or ribbons of gut and collects and maintains said ribbons in easily handled bunches which may readily be formed into skeins.

Another object of the invention is to provide a method of splitting gut employing fluid jet means for training the gut over a guide peg and a cutting blade positioned crosswise to, or at right angles to, the direction of movement of the gut.

A further object of the invention is to provide a new method of handling the gut after it is split, which eliminates the possibility of entanglement with consequent delay in production and loss due to breakage.

Still a further object of the invention is to provide a method of splitting gut which contemplates urging the gut against a cutting blade without distorting the gut, so that the ribbons cut are consistently uniform in width.

Still another object of the invention is to provide a method of handling gut which may be praticed and operated efficiently by even the most unskilled workers.

In accordance with the illustrated embodiments of the invention, I provide a method in which the gut is drawn over a relatively flat guide peg by a pair of flat jets positioned on and directed against each flat side of the guide peg. The gut is urged against one or both runs of a band blade positioned crosswise or perpendicular to the guide peg, and the ribbons pass into separate hoppers disposed below the guide peg, together with the fluid from the jets, which fluid conveys the ribbons into a troughing device. In the troughing device, one end of the gut is immobilized and the other end is conveyed by the said fluid through the device until the gut extends lengthwise of the device. The gut is held in this position by the immobilizing means until it is desired to remove the gut for further processing.

It will be appreciated that the present invention provides substantial advantages over prior practices. For instance, the method provided by my invention not only permits the individual worker to split a materially increased number of high quality gut per work day, but it also provides a concurrent washing of the gut and ribbons throughout the splitting and conveying operation, and disposes and maintains the ribbons in a position for ready handling after the splitting operation is complete. Moreover, there is an almost total absence of breaking of guts and ribbons or other damages causing loss of material and time.

Other objects, uses and advantages will be obvious or become apparent from a consideration of the following description and the drawings.

In the drawings:

Figure 1 is a front elevational view of a preferred form of apparatus comprising my invention;

Figure 2 is a plan view of the apparatus shown in Figure 1;

Figure 3 is an enlarged front elevational view of the gut splitting elements of the apparatus shown in Figure 1;

Figure 3a is a fragmental cross-sectional view along line 3a—3a of Figure 3;

Figure 4 is a sectional view along line 4—4 of Figure 3, with parts broken away for clarity of illustration;

Figure 5 is an enlarged fragmental front elevational view, similar to Figure 3, illustrating the action of the fluid jets against the cutting blade and the guide peg, with parts shown in section;

Figure 6 is a bottom plan view of one of the jet nozzles;

Figure 7 is a perspective view illustrating the relation of the guide peg, the jet nozzles, the cutting blade and the gut receiving hoppers;

Figure 8 is an enlarged perspective view illustrating the manner in which the fluid jets should impinge against the gut in the area of the cutting blade;

Figure 9 is a sectional view along line 9—9 of Figure 3, with the guide peg removed for clarity of illustration;

Figure 10 is a sectional view through a gut illustrating how the gut is split in the appartus of Figures 1–9;

Figure 11 is a sectional view along line 11—11 of Figure 4;

Figure 12 is a view similar to Figure 9 with parts shown in section along line 12—12 of Figure 3;

Figure 13 is a view similar to Figure 2 but on an enlarged scale, with parts broken away;

Figure 14 is a plan view of the upper portion of the troughing apparatus forming a part of my invention;

Figure 15 is a sectional view along line 15—15 of Figure 14;

Figure 16 is a side elevational view of one end of the troughing apparatus, more particularly illustrating the linkage for operating the gut snagging device;

Figure 17 is a perspecitve view of a portion of the endless snagging or catching element employed in the troughing apparatus;

Figures 18–20 are diagrammatic plan views illustrating a preferred manner of operating the troughing apparatus;

Figure 21 is a plan view of a portion of the linkage employed in the troughing apparatus;

Figure 22 is a perspective view of one of the swinging flow directing elements employed in the troughing apparatus;

Figure 23 is a fragmental side elevational view illustrating a modified form of gut splitting apparatus;

Figure 24 is a front elevational view illustrating a further form of gut splitting apparatus; and Figures 25 and 26 are sections through a gut illustrating how the gut is cut in the apparatus shown in Figures 23 and 24, respectively.

*General description*

Referring now more particularly to Figures 1 and 2, reference numeral 10 generally indicates one form of my improved apparatus for handling sheet gut which includes gut splitting apparatus 12 and troughing apparatus 14. Briefly, the apparatus is operated by the worker standing on platform 103 and, after stepping on treadle 105 to admit water or other fluid under pressure to the apparatus piping, drawing a gut from a receptacle or tank 16 and threading it over the point of the guide peg 18 (see Figure 4). The operator brings the end of the gut down on the peg to within the streams of jets 20 (see Figures 3, 4, 5 and 7) issuing from the nozzles 22, whereupon the jets take control of the gut and feed it downwardly across the passes of powdered blade 24 to form, in the embodiment of Figures 1 and 2, four ribbons proportioned as shown in Figure 10. The fluid forming jets 20, such as water, carry or convey the ribbons into four separate hoppers 26, 28, 30 and 32 (see Figures 7 and 9), leading to piping generally indicated at 34 that convey the respective ribbons to separate troughs in a troughing apparatus 14.

The respective ribbons pass from adjustable flow directing elements 38 (see Figure 2) into separate troughs, elements 38 being positioned to direct the flow down one side of a snagging or catching means 40 positioned in the center of each trough, each means 40 comprising an elongate longitudinally extending element formed with a plurality of relatively short, upstanding, catching arms (see Figure 17), mounted in the center of each trough. After an appropriate length or portion of each ribbon has entered the respective troughs of the troughing apparatus, the flow directing elements 38 are shifted to direct flow down the other side of the snagging means 40 whereupon the respective ribbons engage on or between several of the upstanding arms and the remainder of their lengths pass through the other side of the respective troughs until the ribbons extend lengthwise thereof. The snagging means 40 includes means (to be described) for automatically advancing same to the left of Figures 1 and 2 so that the gut ribbons do not build up in one spot. The snagging means holds the gut until a sufficient number of ribbons have been formed to make up a suitably sized skein, whereupon they are gathered together and lifted as a whole from the troughing apparatus.

*The gut splitting apparatus*

The gut splitting apparatus is illustrated more particularly in Figures 3–9, and compirses a suitable box-like supporting frame 44 having fixed thereto, as by welding, a pair of short bars 45 which support a block element 46, as by bolts 48 (see Figure 4), in which the guide peg 18 is received (see Figure 5). The guide peg 18 is a generally flat, horn like piece curved as indicated in Figure 4, but mounted to stand upright in a vertical plane. It is hollow as shown at 47 and is formed with a nozzle 48 at its tip through which a jet of fluid is delivered that assists in opening the gut and in supplying lubricant to ease the passage of the gut down over the peg 18. One or more further orifices 49 may be formed in peg 18 to supply further lubrication. The interior of the guide peg communicates with a passage 50 (see Figure 5) formed in the block element 46, which is supplied with water or other fluid, as hereinafter described.

The base 52 of the peg 18 is somewhat wider than the tip, as seen in Figure 4, and is formed with a longitudinally extending slot 54 to receive one run or pass 55 of the band blade 24. The inner or back, or concave edge of the peg 18 is provided with a curved spring 56 to distend the gut and hold the short side of the gut to the right of Figure 4, as hereinafter more particularly described. The second run or pass 57 of the band blade 24 is received, in the embodiment of Figures 1 and 2, between the rear or inner edge of the guide peg and the spring 56. The latter edge may be formed with a finger 53 (see Figure 4) adapted to maintain the run or pass 57 from sidewise vibration.

Each run or pass of the band blade 24 thus provides cutting means formed with cutting edges that extend normally of and laterally away from the base 52 of peg 18 at the wide sides thereof.

The guide peg and band blade 24 of the embodiment of Figures 1 and 2 are arranged to split the gut in the manner shown in Figure 10. Generally speaking, the gut has a longer, relatively smooth side 58 and a shorter, coarse side 59, partially due to the spiralled position of the gut in the body of the animal. The runs 55 and 57 of band blade 24 are arranged to cut the gut into four ribbons 60, 62, 64 and 66, ribbon 66 including much of the coarse shorter side 59 and the other ribbons being formed out of smooth tissue that has been found to be more desirable in the manufacture of sutures, racket strings and the like. By having the guide peg curved, the short side 59 of the gut is automatically positioned on the short or concave side of peg 18 when the gut reaches the band blade 24, thus insuring that the same ribbons are formed from each gut and that such ribbons each drop into the same hoppers.

The block element 46 comprises a main body portion 63 formed with the slot 65 in which the lower end of peg 18 is received, passage 50, and slots 67 and 69 (see Figures 5 and 12). A cap portion 71 having hopper 26 fixed thereto is secured to body portion 63 by bolts 73, thereby closing slots 67 and 69 to form hoppers 28 and 30. The fourth hopper 32 is fixed to the means for adjusting the position of the inner run 57 of the band blade, as more particularly described hereinafter.

The guide peg 18 is flanged on either side by a nozzle 22 having a jet opening 68 designed to deliver a flat jet substantially equal in width to the width of base 52 of the peg including finger 53 and spring 56 (see Figures 5, 6 and 8). The nozzles 22 are respectively secured to intermediate piping 69 including an elbow 70 screwthreadedly mounted in an elbow 70a secured to the supporting piping 72. Provision is therefore made for an up and down movement of the nozzles 22 about a vertical axis, as will be observed in Figure 3, which permits the action of the jets on the guide peg and gut trained thereover to be adjusted as desired. The jet openings 68 may be adjusted in thickness by appropriately moving the plate 74 with respect to the remainder of the jet. As shown in Figures 5 and 6, this may be done by loosening screws 75 and twisting bolt 77 to the desired position, the nozzles 22 and plates 74 being formed with slots 79 to permit limited adjustment of the jet openings 68.

The band blade 24 is an endless metal strip trained around pulleys 76 rotatably mounted in any suitable manner in the supporting frame 44. One of the pulleys may be driven by a motor and pulley means controlled by a switch 81. The inner run 57 of the band blade is deflected outwardly by blocks 78 so as to bring the two runs or passes of the blade relatively close together and parallel for splitting the gut in the manner indicated in Figure 10. As mentioned above, the outer pass or run 55 of the blade is received in the slot 54 and the inner pass or run 57 of the band blade is received between the finger 53 and the main portion of the base 52 of the peg.

The guide blocks 78 are mounted for adjustment so that appropriate tension may be maintained on the band blade, and to very the distance between the parallel passes of the blade in the splitting area so that the width of the gut ribbons may be varied. As shown in Figures 4 and 9, the blocks 78 are slidably mounted on a rod 80 and are respectively screwthreadedly mounted on a right and left screw rod 80a, the latter being employed to shift the blocks 78 toward or away from each other to adjust the tension in the band blade 24. The screw may be turned by, for instance, inserting a suitable tool in holes (not shown) formed in rod 80a after removal of bracket 82 to which hopper 32 is fixed, or in any other suitable manner. The rod 80 and the screw 80a are mounted in a head 84 to which is fixed, by pin 85, a screw 86 that is slidably mounted in a yoke 88. A hollow nut 90 is rotatably mounted in the rear or inner arm 92 of the yoke 88 and is in screwthreaded engagement with the screw 86. The nut has fixed thereto a knurled element 94, and it will be appreciated, that by turning the nut 90 to move the head 84 to the right or left of Figure 7 (inwardly or outwardly of the apparatus), the distance between the passes of blade 24 may be varied. A locking bolt 96 is employed in the illustrated embodiment to hold the head 84 in selected position. The bolt 96 is received in slot 95 formed in head 84 and passes through a similar slot 97 (see Figure 11) formed in screw 86 to be screwthreadedly engaged in a suitable hole formed in support 44.

The rear or inner hopper 32 is fixed to the head 84 by bracket 82, as shown in Figure 4, and therefore is adjusted with it. Bracket 82 is fixed to head 84 by bolts 83, said bolts 83 passing through slots 87 formed in bracket 82 to permit adjustment of hopper 32 independently of head 84.

The head 84 is adjustably mounted by the above described means to permit adjustment of the rear pass 57 of blade 24 when guide pegs of a size or shape different from peg 18 are employed.

The receptacle or tank 18 rests on one side of support 44 as seen in Figure 4 and in the embodiment illustrated includes two removable covers 98 on either end thereof (see Figures 1, 2 and 13), one having a horn 100 fixed thereto within reach of the operator. The tank is formed with an inclined recess or groove 101 immediately behind the guide peg 18. As shown in Figures 1, 2 and 13, the apparatus includes a platform 103 on which the worker stands when operating the apparatus, treadle 105 operating a conventional valve in a conduit leading to a source of supply, which valve admits water to piping 107, controlled, if desired, by valve 109, and conducts the water internally of the frame 44 in any suitable manner (not illustrated) to the respective pipes 72. Conduit 111 conducts water independently of the valve operated by treadle 105 through control valve 113 to piping 115 employed to conduct same to internal compartments 117 (see Figure 9) formed in blocks 78 from which it passes through passages 119 to lubricate the band blade 24. A conduit 121 leading from piping 107 downstream of valve 109 has communication with passage 50 formed in block element 46 for conducting water to guide peg 18. Cover elements 131, hinged to frame 44 as at 133 (see Figure 14) may be provided to cover pulleys 76.

As shown in Figures 3a and 7, the pass 55 of the band blade operates in holder elements comprising Bakelite bars 102 and 104 secured to angle bars 106 fixed to bars 45 and block element 46 by the bolts 48 (see Figure 4). The bars 102 are fixed to the respective bars 106 by screws 123, while the bars 104, which include a foot 125, are resiliently urged toward the respective bars by springs 127 about screws 129 securing them to bars 102. The respective feet 125 are in contact with the upper ends of the respective bars 106 (see Figure 3a). The holder elements prevent vibration of the front or outer pass 55 of the band blade.

To operate the gut splitter device in the manner described generally above, the worker after turning on the valve admitting water to the conduit in which the valve operated by treadle 105 is interposed, mounts the platform 103 and operates switch arm 81 to set the band blade in motion. Then, after gathering a group of whole gut lengths together from tank 16 and looping them around horn 100 somewhat as shown in Figure 13, and stepping on treadle 105, the worker grasps the most convenient gut, lifts it off the horn 100, and applies the end thereof to the guide peg as described above. After the gut starts over the peg, the remainder of its length slips into recess 101 which guides it toward the guide peg 18. The jets 20 should be adjusted so that they impinge against the gut between the dotted lines of Figure 8. When the jets are applied in this area, they apply a combined pushing pulling action around substantially the entire periphery of the gut at the point where the working edges of the band blade passes cut the gut. This insures that the gut is applied to the band blade without contorsion. The flat jets acting with substantially equal force around substantially the entire periphery of the gut provide a cutting area in which the gut tissues are flattened out and apply a biasing force on the gut that is evenly distributed. The spring 56 stretches and further flattens out the gut, thus insuring that any unevenness in the gut structure is taken up in the most undesirable strip formed by the band blade. After the respective gut strips or ribbons are formed, they automatically pass into the respective hoppers disposed beneath them for conveyance to the troughing apparatus now to be described.

The troughing apparatus

Referring now more particularly to Figures 13–21, the hoppers 26, 28, 30 and 32 are respectively connected to pipes 110, 112, 114 and 116, retained in position with respect to element 46 by plate 133 fixed to the latter (see Figure 4) which pipes lead to inclined troughs 118, 120, 122 and 124, respectively, of troughing apparatus 14. The cap portion 71 of block element 46 is formed with a suitable passage (not shown) connecting hopper 26 with pipe 110. The uppermost reaches or levels of the troughs are formed by an inclined bottom plate 126, side plates 128 and the dividing plates 130. The bottom plate 126 is formed with longitudinally extending slots 132 positioned in the center of each of the troughs, and intermediate sidewalls 134 (see Figure 15) are fixed to the plate 126 on either side of these slots, a short connecting element 136 fixing the respective sets of walls 134 together at the lower end of plate 126. In each slot 132, between the respective sets of walls 134, an endless pulley belt 136 is mounted, the respective belts being trained over pulley wheels 138 and 140 positioned adjacent the ends of the slots and keyed respectively to shafts 142 and 144 rotatably mounted on the lower surface of plate 126. Each belt 136 has secured to the outer surface thereof an endless strip 146 of screen wire material or the like, the loose ends 148 of which may be turned upwardly, to provide upstanding catching or snagging elements or arms, as shown in Figure 17.

Short shafts or bars 150 are pivotally mounted in plate 126 between the ends of the pipes 110, 112, 114 and 116 and the respective slots 132, as shown in Figures 14 and 15. In the present embodiment, the shafts or bars 150 are mounted in the channel member 152 fixed in any suitable manner to the lower surface of plate 126, and said shafts or bars 150 protrude sufficiently above the upper surface of plate 126 to permit the flow adjusting elements 38, comprising converging sidewalls 156 fixed to a web 158 and a cover plate 157 fixed to the tops of sidewalls 156, to be fixed or keyed to these shafts in any suitable manner. Fixed to the lower ends of shafts or bars 150 are links 160 that are pivotally connected to a transversely extending bar 162.

Referring to Figures 16 and 21, it will be seen that one side of the bar 162 is adapted to engage a follower element 166 secured to a bar 168 pivotally connected to a lever 170 pivoted intermediate its ends on the end of shaft 144. Lever 170 carries a pivoted pawl 172 held by gravity or a suitable spring in engagement with a suitable ratchet wheel 174 keyed to shaft 144. A rod 176 is screwthreadedly received in or otherwise secured to the bar 168 with its outwardly protruding end slidably arranged in a bar 178 fixed to member 152. Nuts 177 applied to rod 176 prevent its removal from bar 178. A compression spring 180 received about the rod 176 is interposed between the bar 168 and the bar 178.

A handle 182 is fixed to the cover plate 157 of the flow directing element 38 positioned adjacent the worker's station in front of the gut splitting apparatus 12, as shown in Figure 13. Alternately, handle 182 may be fixed to the shaft 150 of the element 38 below member 152.

The lower reaches or lengths of the respective troughs shown more particularly in Figures 1, 15 and 16 may each comprise an elongate downwardly inclined plate 186 formed with alternating grooves 187 and ridges 189, two of the grooves 187 and an intervening ridge 189 being substantially equal in width to the respective troughs 118, 120, 122 and 124 of which they respectively form a continuation. Each plate 186 is preferably turned up at each side thereof to form a side 191 for the outer grooves 187. Said elements 186 are connected one to the other by elbow elements 188 providing a communication between the corresponding grooves 187 of each plate 186. The elements 188 are similar to elbow elements 190 connecting the upper reaches or length of the respective troughs 118, 120, 122 and 124 to the grooves 187 in next lower reach thereof, said elements 190 comprising sheet metal suitably bent and welded to form the shape indicated in Figures 15 and 16. Any number of elements 186 and 188 may be employed as determined by space limitations and the length of gut to be split. The lower element 186 may convey the fluid to a box 192 (see Figure 1) containing a wire frame 193 for catching short pieces of gut. The box 192 includes an overflow flange 195 directing flow of fluid to a suitable drain. The troughing elements may be secured to suitable uprights 194 between four of which the gut splitting apparatus is mounted.

The troughing apparatus is preferably handled in the following manner. After the worker has placed a gut on the guide peg 18 and the jets 20 have taken hold of it to urge it against the band blade 24, the worker grasps the handle 182 and pulls it toward him as far as he can. This moves bar 162 toward him and positions the flow adjusting elements 38 as shown in full lines in Figures 13 and 18. This movement also moves the ratchet wheel 174 counterclockwise (as seen in Figure 16) one notch, as more particularly described hereinafter. Referring to Figures 18-20, which diagrammatically illustrate the trough 124, or the trough most closely adjacent the worker, when the end of the gut ribbon 185 has approximately reached the point 126a which may be a line formed in plate 126 on the side of trough 124 nearest the worker, as shown in Figure 18, the worker thereupon moves the handle 182 away from him as far as he can, whereupon the flow adjusting elements are disposed in the dotted line positions of Figure 14 and the full line position of Figure 19. The flow of fluid carrying the strip of gut is then directed down the other side of the trough and the snagging or catching device 40 and the worker allows the remainder of the ribbon to be completely carried from the gut splitting apparatus and down through the remaining length of the trough 124 including the down stream groove 187 forming a part thereof. The upstream edges 156a of the elements 38 engage the sides of the respective pipe ends to define the limits of movement of these elements.

The leading end of the gut is caught or snagged in or on the ends 148 of the wire strip 146 and the trailing end of the gut is carried lengthwise of the trough in which it is disposed until it extends lengthwise thereof. The flow of water is not great enough to puncture the gut ribbons in the illustrated apparatus. After the operator has applied the next gut to the guide peg, he again pulls the handle 182 toward him, which is effective to operate the lever 170 and pawl 172 thereby moving the ratchet wheel 174 counter-clockwise one notch, as viewed in Figure 16. Since wheel 174 is keyed to shaft 144, the pulley wheels 140 advance the pulley belt 136 and wire strip 146 a corresponding distance away from the flow adjusting elements 38 and raise the first mentioned gut ribbon out of the way of the next gut ribbon. When the handle is swung away from the worker, the spring 180 acts to position pawl 172 in its starting position. As the handle approaches the limit of its movement away from the operator, bar 162 swings away from follower 166, as indicated in dotted lines in Figure 21.

The worker may operate the apparatus 10 in this manner until a number of guts are split, for instance 40, and then gather the ribbons held in place by the snagging or catching device of each trough into a skein for further handling. If desired, when said suitable number of ribbons has been arrived at, the worker may reverse his operation of the apparatus, and dispose the long ends of the gut down the outer side of trough 124. Thus the provision of two grooves 187 in the lower reaches of each trough permits each side of the trough to be worked in the manner described above. By operating the troughing apparatus in the manner described above, the gut in all the troughs is automatically controlled.

The individual troughs together with the respective pipes 110, 112, 114 and 116 each comprise an elongate conduit means in which the flow adjusting devices 38 and the snagging, catching, or immobilizing means 40 are positioned.

*Modifications*

Figures 23-26 illustrate modifications of the gut splitting apparatus. In Figure 23, the modified guide peg 18 is formed with a slot 200 in the center of its base 52 that receives run 55 of the band blade and is provided with just two hoppers 202 and 204 which respectively receive the ribbons 206 and 208 split as shown in Figure 25 by one run of the band blade 24. In this embodiment of the invention, the blocks 78 (not shown) are positioned considerably rearwardly by the guide peg 18 (to the right of Figure 23) so that the other run 57 of the blade 24 will be out of the way. The hoppers may be mounted on two elements 205, each similar to cap 71, secured together by bolts 207 and nuts 209, and fixed between arms 215, similar to arms 45. The lower portions of elements 205 should be formed to provide communication with pipes 211 and 213 leading to a troughing apparatus of the type described above, and these elements may be provided with mating or lapping grooves to receive peg 18 between them and provide communication between pipe 121a and the peg.

In Figure 24, a modified guide peg 210 is employed which is curved over one of the jet nozzles 22, though it is still positioned in a vertical plane. A spring 212, similar to spring 56 is mounted on the convex flat side of peg 210. The remainder of this form of gut splitting apparatus is the same as that of Figures 1–12. When the gut is applied to the peg 210 it is split in four ribbons 214, 216, 218 and 220 by the runs or passes 55 and 57 of the blade 24. As will be noted in Figure 26, three of the strips or ribbons will contain a portion of the short side 59 of the gut. It has been found that spliting the gut in this manner produces gut strips of somewhat greater strength.

In summary, the herein described invention improves over prior practices by splitting gut crosswise or at right angles to its travel over a guide peg, by employing fluid jet propelling means that is applied to the gut in the area where it is being cut, said propelling means substantially encircling the gut above and below the cutting edges of the blades employed and maintaining the gut in flattened relation with said cutting edges and the guide peg, and employing a flow of fluid from the apparatus jets or otherwise to prevent entanglement of the gut ribbons.

The foregoing description and the drawings are given merely to explain and illustrate my invention, and the manner in which it may be performed, and the invention is not to be limited thereto, except insofar as the appended claims are so limited since those skilled in the art who have my disclosure before them will be able to make modifications and variations therein without departing from the scope of the invention.

I claim:

1. In the art of splitting gut by passing the gut over a guide peg and against cutting means in alignment with the path of gut movement defined by the guide peg, the improved method of splitting the gut which includes the steps of applying one end of the gut over the peg to dispose the inceptive end of the guide peg within the gut, angularly directing a substantially uniform liquid jet flow against a localized circumferential area of the portion of the gut that is received over the gut peg, about a substantial portion of said area and in the direction required to train the remainder of the gut over the guide peg, and feeding said localized portion of the gut, under the impetus of the jet flow, against a rectilinear cutting edge disposed substantially at right angles to the path of gut movement over the guide peg.

2. In the art of splitting gut by passing the gut over a guide peg and against cutting means in alignment with the path of gut movement defined by the guide peg, the improved method of splitting the gut which includes the steps of applying one end of the gut to the guide peg, directing a substantially uniform liquid jet flow against either side of a localized circumferential area of the portion of the gut that is received over the gut peg in the direction required to train the remainder of the gut over the guide peg, and applying the thus trained gut against a rectilinear cutting edge disposed substantially at right angles to the path of gut movement over the guide peg.

3. In the art of splitting gut by passing the gut over a guide peg and against cutting means in alignment with the path of gut movement defined by the guide peg, the improved method of splitting the gut and subsequently handling the thus formed gut ribbons which includes the steps of training the gut over the guide peg under the impetus of a substantially uniform liquid jet flow against a portion of the gut that is trained over the guide peg, splitting the gut to form the gut ribbons, employing the liquid from the liquid jet flow to convey the ribbons as they are being formed lengthwise thereof from the guide peg, and after the ribbons are fully formed, immobilizing the individual ribbons while maintaining the liquid flow about them.

4. The improved method of handling gut which includes the steps of splitting the gut to form gut ribbons, immersing the gut ribbons, as they are being formed, into a flowing liquid bath, immobilizing one end of the respective gut ribbons, and employing the flowing liquid bath to maintain the respective ribbons in stretched out relation.

5. The process of splitting gut which includes feeding a gut lengthwise thereof with a stream of water against a rectilinear cutting edge disposed at right angles to the path of movement of the gut to form gut ribbons, conveying the individual gut ribbons away from the cutting edge in separate branches of the stream, and immobilizing the individual gut ribbons in their respective streams while maintaining the liquid flow about them.

6. The process set forth in claim 5 wherein like ribbons of successively split gut are accumulated in the respective stream branches while maintaining the liquid flow about them.

References Cited in the file of this patent
UNITED STATES PATENTS

| | | |
|---|---|---|
| 1,416,355 | Johnson | May 16, 1922 |
| 1,925,841 | Matthews | Sept. 5, 1933 |
| 2,033,946 | Lippincott | Mar. 17, 1936 |
| 2,641,020 | Clemens | June 9, 1953 |
| 2,722,348 | Ammon | Nov. 1, 1955 |